US012615582B2

(12) United States Patent
Selén et al.

(10) Patent No.: US 12,615,582 B2
(45) Date of Patent: \*Apr. 28, 2026

---

(54) BEAMFORMING

(71) Applicant: Telefonaktiebolaget LM Ericsson (publ), Stockholm (SE)

(72) Inventors: Yngve Selén, Uppsala (SE); Jonas Kronander, Knivsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,368

(22) Filed: Oct. 16, 2023

(65) Prior Publication Data

US 2024/0049120 A1 Feb. 8, 2024

Related U.S. Application Data

(63) Continuation of application No. 17/380,449, filed on Jul. 20, 2021, now Pat. No. 11,832,168, which is a (Continued)

(51) Int. Cl.
*H04W 16/28* (2009.01)
*H04B 7/06* (2006.01)
(Continued)

(52) U.S. Cl.
CPC .......... *H04W 48/16* (2013.01); *H04B 7/0617* (2013.01); *H04B 7/086* (2013.01); *H04B 7/0417* (2013.01)

(58) Field of Classification Search
CPC ..... H04W 16/28; H04W 64/00; H04W 48/16; H04W 74/0833; H04W 72/23; H04L 5/0091; H04L 5/0035; H04L 41/0668
See application file for complete search history.

(56) References Cited

U.S. PATENT DOCUMENTS

| 6,606,058 B1 | 8/2003 | Bonek et al. |
| 7,197,337 B2 | 3/2007 | Goldberg et al. |

(Continued)

FOREIGN PATENT DOCUMENTS

| CN | 1346525 A | 4/2002 |
| CN | 101978618 A | 2/2011 |

(Continued)

OTHER PUBLICATIONS

Office Action for Japanese Patent Application No. 2017-558994 dated Jan. 15, 2019, 12 pages including English translation.

(Continued)

*Primary Examiner* — Anez C Ebrahim

(74) *Attorney, Agent, or Firm* — Sage Patent Group

(57) ABSTRACT

A method performed by a network node of a wireless network includes determining at least one spatial information of a device attached to the wireless network via a radio interface, determining a preferred spatial direction depending on the at least one spatial information of the device, and sending a control message to the device. The control message indicates the preferred spatial direction and prompts the device to execute transmission and/or reception on a plurality of beamformed directions and to prioritize transmission and/or reception on a first beamformed direction of the plurality of beamformed directions over transmission and/or reception on a second beamformed direction of the plurality of beamformed directions.

14 Claims, 11 Drawing Sheets

Related U.S. Application Data continuation of application No. 16/585,459, filed on Sep. 27, 2019, now Pat. No. 11,102,712, which is a continuation of application No. 15/037,089, filed as application No. PCT/EP2015/060680 on May 13, 2015, now Pat. No. 10,462,732.

(51) Int. Cl.
    *H04B 7/08*       (2006.01)
    *H04W 48/16*     (2009.01)
    *H04B 7/0417*    (2017.01)

(56) References Cited

U.S. PATENT DOCUMENTS

| | | | |
|---|---|---|---|
| 7,340,279 | B2 | 3/2008 | Chen et al. |
| 7,881,258 | B2 | 2/2011 | Gilbert et al. |
| 8,351,521 | B2 | 1/2013 | Lakkis |
| 8,615,050 | B2 | 12/2013 | Lakkis |
| 8,804,796 | B2 | 8/2014 | Zhou |
| 9,084,221 | B2 | 7/2015 | Sampath et al. |
| 9,100,068 | B2 | 8/2015 | Lakkis |
| 9,130,631 | B2 | 9/2015 | Sampath et al. |
| 9,318,794 | B2 | 4/2016 | Chang et al. |
| 9,647,737 | B2 | 5/2017 | Obara et al. |
| 9,680,552 | B2 | 6/2017 | Ko et al. |
| 9,876,542 | B2 | 1/2018 | Sampath et al. |
| 2002/0137538 | A1 | 9/2002 | Chen et al. |
| 2004/0229652 | A1 | 11/2004 | Goldberg et al. |
| 2005/0026562 | A1 | 2/2005 | Goldberg et al. |
| 2007/0142050 | A1 | 6/2007 | Handforth et al. |
| 2009/0232240 | A1 | 9/2009 | Lakkis |
| 2009/0298502 | A1 | 12/2009 | Hagerman et al. |
| 2009/0318088 | A1 | 12/2009 | Wu et al. |
| 2010/0159845 | A1 | 6/2010 | Kaaja et al. |
| 2010/0164805 | A1 | 7/2010 | Niu |
| 2010/0215027 | A1 | 8/2010 | Liu et al. |
| 2010/0291931 | A1 | 11/2010 | Suemitsu et al. |
| 2011/0018767 | A1 | 1/2011 | Maltsev et al. |
| 2011/0032149 | A1 | 2/2011 | Leabman |
| 2011/0205969 | A1 | 8/2011 | Ahmad et al. |
| 2011/0273977 | A1 | 11/2011 | Shapira et al. |
| 2011/0287796 | A1 | 11/2011 | Jain et al. |
| 2012/0057575 | A1 | 3/2012 | Taghavi Nasrabadi et al. |
| 2012/0263126 | A1 | 10/2012 | Choi et al. |
| 2013/0040682 | A1 | 2/2013 | Chang et al. |
| 2013/0198348 | A1 | 8/2013 | Zuk et al. |
| 2013/0223487 | A1 | 8/2013 | Zhou |
| 2014/0055302 | A1 | 2/2014 | Jia |
| 2014/0073329 | A1 | 3/2014 | Kang et al. |
| 2014/0204902 | A1 | 7/2014 | Maltsev et al. |
| 2015/0009951 | A1 | 1/2015 | Josiam et al. |
| 2015/0071367 | A1 | 3/2015 | Hwang et al. |
| 2015/0264583 | A1 | 9/2015 | Sundström et al. |
| 2015/0349863 | A1 | 12/2015 | El Ayach et al. |
| 2016/0014566 | A1 | 1/2016 | Bengtsson et al. |
| 2016/0135007 | A1 | 5/2016 | Persson et al. |
| 2016/0198348 | A1 | 7/2016 | Jover |
| 2016/0323898 | A1* | 11/2016 | Jo .......................... H04B 7/0695 |
| 2016/0359533 | A1 | 12/2016 | Obara et al. |
| 2016/0380820 | A1 | 12/2016 | Horvitz et al. |
| 2017/0033854 | A1 | 2/2017 | Yoo |
| 2017/0078001 | A1* | 3/2017 | Kim ..................... H04B 7/0871 |
| 2017/0230094 | A1* | 8/2017 | Da Silva ............... H04W 16/28 |
| 2017/0373731 | A1 | 12/2017 | Guo et al. |
| 2018/0152869 | A1 | 5/2018 | Cedergren et al. |
| 2019/0379439 | A1 | 12/2019 | Bolin et al. |

FOREIGN PATENT DOCUMENTS

| | | |
|---|---|---|
| CN | 102783201 A | 11/2012 |
| CN | 102812770 A | 12/2012 |
| DE | 102010043122 A1 | 5/2012 |
| EP | 2636163 A1 | 9/2013 |
| JP | 2003-198441 A | 7/2003 |
| JP | 2005-509309 A | 4/2005 |
| JP | 2007-500991 A | 1/2007 |
| JP | 2009-530900 | 8/2009 |
| JP | 2011-526429 A | 10/2011 |
| JP | 2013-520937 A | 6/2013 |
| JP | 2013-179423 A | 9/2013 |
| RU | 2012108995 A | 9/2013 |
| WO | 2009057544 | 5/2009 |
| WO | 2010025996 A1 | 3/2010 |
| WO | 2012061616 A1 | 5/2012 |
| WO | 2013028012 A2 | 2/2013 |
| WO | 2014124237 A1 | 8/2014 |
| WO | 2015086079 A1 | 6/2015 |
| WO | 2016005009 A1 | 1/2016 |
| WO | 2016086144 A1 | 6/2016 |
| WO | 2015125891 A1 | 3/2017 |

OTHER PUBLICATIONS

Letter and English Summary of Official Action for Japanese Patent Application No. 2017-558994 dated Oct. 26, 2018, 4 pages.

Arjan Doff, Sensor-Assisted Movement Identification and Prediction for Beamformed 60 GHz Links, Delft University of Technology Master's Thesis in Embedded Systems, Embedded Software Group, Faculty of Electrical Engineering, Mathematics and Computer Science, Delft University of Technology, Mekelweg 4, 2628 CD Delft, The Netherlands, Jan. 19, 2015, 60 pages.

Official Action for Russian Patent Application No. 2017143406 mailed Mar. 14, 2018, 5 pages.

International Search Report and Written Opinion of the International Searching Authority, Application No. PCT/EP2015/060680 mailed Jan. 15, 2016, 15 pages.

Notice of Allowance for Japanese Patent Application No. 2017-558994 mailed Dec. 20, 2019, 3 pages.

Examination Report mailed Jan. 13, 2020 for Indian Patent Application No. 201717038514, 7 pages.

European Office Action, European Patent Application No. 19193726.7, mailed May 12, 2025, 6 pages.

* cited by examiner

Receive trigger message — 801

Determine spatial information — 802

Determine prioritization — 803

Determine antenna weights — 804

Scan surrounding by executing transmission on a plurality of beamformed directions — 805

Access node discovered? — 806

NO

YES

Prepare for handover — 807

805, 905

Select current direction
from plurality of beamformed directions
based on predetermined sequence
or based on probability weights
— 1001

Execute transmission
on current direction
employing respective antenna weights
— 1002

Access node discovered
in current direction?    1003    YES

NO

Further direction?    1004
YES

NO

Further iteration?    1005    NO
YES

1100

| 0,1408 | 0,2123 | 0,2500 | 0,2123 | 0,1408 |
| 0,2123 | 0,3752 | 0,5000 | 0,3752 | 0,2123 |
| 0,2500 | 0,5000 | 1,0000 | 0,5000 | 0,2500 |
| 0,2123 | 0,3752 | 0,5000 | 0,3752 | 0,2123 |
| 0,1408 | 0,2123 | 0,2500 | 0,2123 | 0,1408 |

| 0,0198 | 0,0451 | 0,0625 | 0,0451 | 0,0198 |
| 0,0451 | 0,1408 | 0,2500 | 0,1408 | 0,0451 |
| 0,0625 | 0,2500 | 1,0000 | 0,2500 | 0,0625 |
| 0,0451 | 0,1408 | 0,2500 | 0,1408 | 0,0451 |
| 0,0198 | 0,0451 | 0,0625 | 0,0451 | 0,0198 |

FIG. 12

BEAMFORMING

CROSS REFERENCE TO RELATED APPLICATIONS

This application is a continuation of U.S. application Ser. No. 17/380,449, filed Jul. 20, 2021, which is a continuation of U.S. patent application Ser. No. 16/585,459, filed Sep. 27, 2019, (now U.S. Pat. No. 11,102,712), which itself is a continuation of U.S. patent application Ser. No. 15/037,089, filed May 17, 2016, (now U.S. Pat. No. 10,462,732) which is a 35 U.S.C. § 371 national stage application of PCT International Application No. PCT/EP2015/060680, filed on May 13, 2015, the disclosures and contents of which are incorporated by reference herein in their entireties.

TECHNICAL FIELD

Various embodiments of the invention relate to a device executing transmission on a plurality of beamformed directions depending on an orientation of the device. In particular, various embodiments relate to techniques of prioritizing transmission on a first beamformed direction of the plurality of beamformed directions over transmission on a second beamformed direction of the plurality of beamformed directions.

BACKGROUND

Beamforming is a promising technique considered for modern mobile communication systems. Beamforming is employed for transmission employing an antenna array that comprises a plurality of antennas. By appropriately setting antenna weights that define a contribution of each one of the antennas of the antenna array to the transmission of a signal, it becomes possible to shape the sensitivity of the transmission to particularly high value in a specific beamformed direction (directive beam). By employing different antenna weights, different beam patterns can be achieved, e.g., different directive beams can be sequentially employed.

Generally, beamforming can be employed by an access node of a wireless network and/or by a communication device (UE) of the wireless network. Where beamforming is employed by a UE that is moving, it may be required to dynamically adapt the antenna weights to compensate for the movement of the UE (dynamic beamforming).

Generally, beamforming can be employed when sending and/or receiving a signal. Beamforming when sending a signal may allow directing the signal towards a receiver of interest during sending; likewise, beamforming when receiving a signal may allow providing a high sensitivity in receiving the signal originating from a transceiver of interest.

Generally, beamforming may allow for better link budgets due to lower required sending signal powers and higher received signal power; this is because transmission power can be anisotropically focused, e.g., into a solid angle of interest, if compared to a conventional scenario not employing beamforming and relying on more or less isotropic transmission.

Not all types of signals are suitable alike for being transmitted employing directive beams. Certain signals such as control signals intend to cover a comparably large surrounding of the UE. This may be a typical scenario with a specific location of the transceiver of interest is unknown or only known at a comparably high uncertainty. For such scenarios, different techniques are known. One technique is to employ so-called beam sweeping where a certain solid angle of the entire surrounding of the UE is "painted" or scanned by sweeping one or several directive beams over the area. A further scenario relies on an omni-directional pattern by means of the appropriate selection of antenna weights or by means of a separate omni-directional antenna. In such scenarios, the potentially high link budget offered by employing beamforming is traded for large area coverage.

In particular, such techniques as explained above face certain drawbacks and restrictions. Typically, where beam sweeping is employed by blindly pointing directive beams, e.g., in an arbitrary order, to discover a transceiver of interest, a time required to successfully discover the transceiver of interest and, therefore, an energy consumption to successfully discover the transceiver of interest can be high. Further, an occupation of the spectrum can be comparably high on average in such scenarios.

SUMMARY

Therefore, a need exists for advanced techniques of beamforming.

According to an aspect, a device attachable to the wireless network via a radio interface is provided. The device comprises an antenna array configured to execute transmission on a plurality of beamformed directions. The device further comprises at least one processor. The at least one processor is configured to determine, based on at least one spatial information of the device, antenna weights of the plurality of beamformed directions. The at least one processor is configured to control the antenna array, based on the antenna weights, to sequentially execute transmission on the plurality of beamformed directions and to prioritize transmission on a first beamformed direction of the plurality of beamformed directions over transmission on a second beamformed direction of the plurality of beamformed directions.

According to a further aspect, a method is provided. The method comprises determining antenna weights of a plurality of beamformed directions based on at least one spatial information of a device. The device that is attachable to a wireless network via a radio interface. The method further comprises controlling an antenna array of the device to sequentially execute transmission on the plurality of beamformed directions and to prioritize transmission on a first beamformed direction of the plurality of beamformed directions over transmission on a second beamformed direction of the plurality of beamformed directions.

According to a further aspect, a network node of a wireless network is provided. The network node comprises an interface configured to execute transmission data on a radio interface of the wireless network. The network node further comprises at least one processor configured to determine at least one spatial information of a device attached to the wireless network via the radio interface. The at least one processor is configured to determine a preferred spatial direction depending on the at least one spatial information of the device. The at least one processor is configured to send a control message to the device. The control message indicates the preferred spatial direction and prompts the device to sequentially execute transmission on a plurality of beamformed directions and to prioritize transmission on the first beamformed direction of the plurality of beamformed directions over transmission on a second beamformed direction of the plurality of beamformed directions.

According to a further aspect, a method is provided. The method comprises determining at least one spatial information of a device attached to the wireless network via a radio interface. The method further comprises determining a preferred spatial direction depending on the at least one spatial information of the device. The method further comprises sending a control message to the device. The control message indicates the preferred spatial direction and prompts the device to sequentially execute transmission on a plurality of beamformed directions and to prioritize transmission on a first beamformed direction of the plurality of beamformed directions over transmission on a second beamformed direction of the plurality of beamformed directions.

According to an aspect, a computer program product is provided. The computer program product comprises program code to be executed by at least one processor of a device. Execution of the program code causes the at least one processor to execute a method comprising: determining, based on at least one spatial information of the device, antenna weights of a plurality of beamformed directions. The device is attachable to a wireless network via a radio interface. The method further comprises controlling an antenna array of the device to sequentially execute transmission on the plurality of beamformed directions and to prioritize transmission on a first beamformed direction of the plurality of beamformed directions over transmission on a second beamformed direction of the plurality of beamformed directions.

According to an aspect, a computer program product is provided. The computer program product comprises program code to be executed by at least one processor of a network node of a wireless network. Execution of the program code causes the at least one processor to execute a method comprising: determining at least one spatial information of a device attached to the wireless network via a radio interface. The method further comprises determining a preferred spatial direction depending on the at least one spatial information of the device. The method further comprises sending a control message to the device, the control message indicating the preferred spatial direction and prompting the device to sequentially execute transmission on a plurality of beamformed directions and to prioritize transmission on a first beamformed direction of the plurality of beamformed directions over transmission on a second beamformed direction of the plurality of beamformed directions.

According to a further aspect, a system is provided. The system comprises a device attachable to a wireless network via a radio interface and a network node of the wireless network. The network node comprises at least one processor configured to determine at least one spatial information of the device. The at least one processor of the network node is configured to determine a preferred spatial direction depending on the at least one spatial information of the device. The at least one processor of the network node is configured to send a control message to the device. The control message indicates the preferred spatial direction and prompts the device to sequentially execute transmission on a plurality of beamformed directions and to prioritize transmission on a first beamformed direction of the plurality of beamformed directions over transmission on a second beamformed direction of the plurality of beamformed directions. The device comprises an antenna array and at least one processor. The antenna array of the device is configured to execute transmission on the plurality of beamformed directions. The at least one processor of the device is configured to determine, based on the at least one spatial direction of the device, antenna weights of the plurality of beamformed directions. The at least one processor of the device is further configured to control the antenna array, based on the antenna weights, to sequentially execute transmission on the plurality of beamformed directions. The at least one processor of the device is further configured to receive the control message. The at least one processor of the device is configured to control the antenna array to prioritize transmission on the first beamformed direction over transmission on the second beamformed direction depending on the preferred spatial direction.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and effects of the invention will become apparent from the following detailed description when read in conjunction with the accompanying drawings, in which like reference numerals refer to like elements.

FIG. 11 illustrates a frequency of occurrence of beamformed directions yielding a comparably broad preferred sector.

FIG. 12 illustrates a frequency of occurrence of beamformed directions yielding a comparably narrow preferred sector.

DETAILED DESCRIPTION OF EMBODIMENTS

Figures 1, 2:
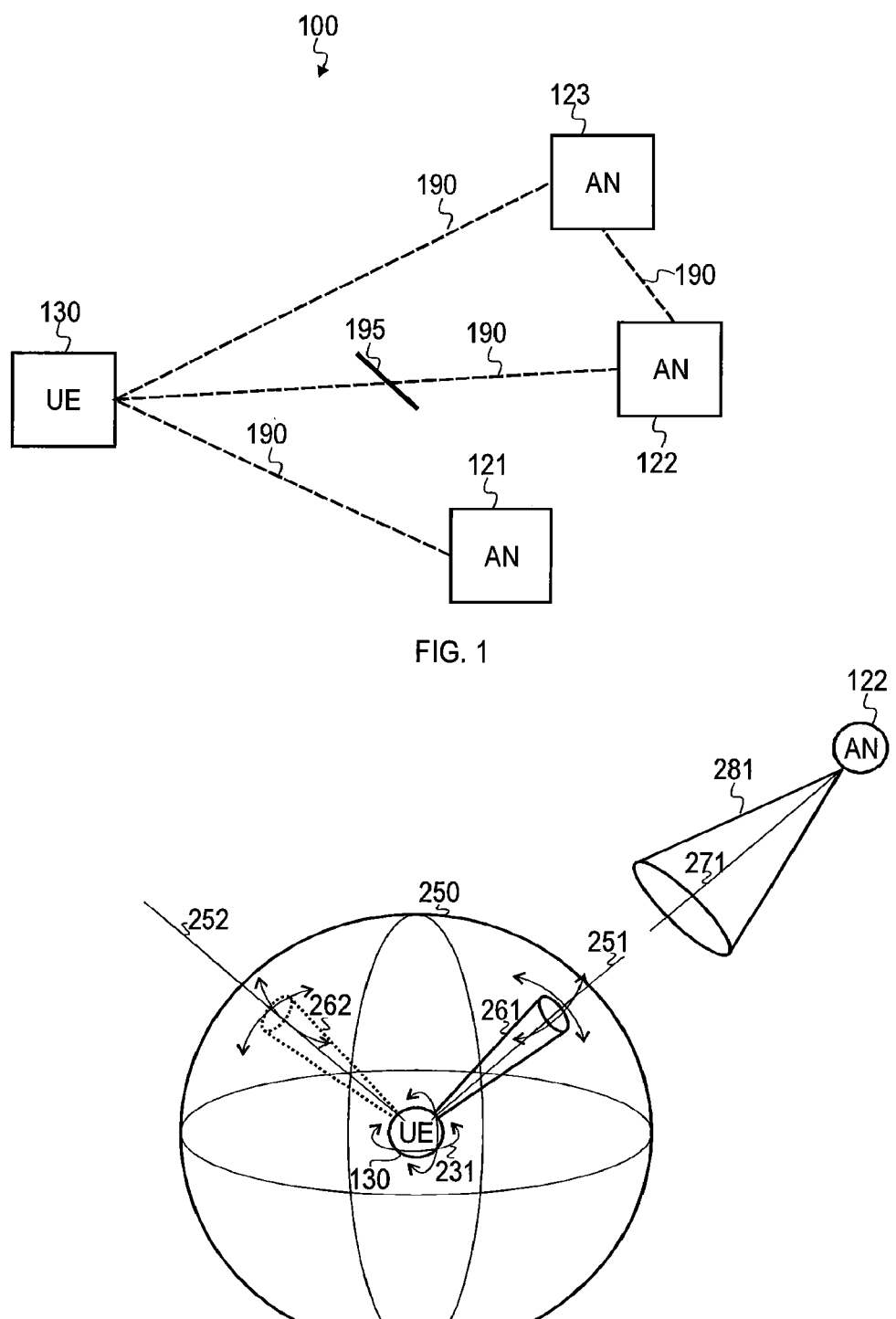
FIG. 1 is a schematic illustration of the wireless network according to various embodiments, wherein a UE is attached to the wireless network.
FIG. 2 schematically illustrates a first directive beam oriented in a first beamformed direction in the surrounding of the UE and further illustrates a second directive beam oriented in the second beamformed direction in the surrounding of the UE according to various embodiments.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques are described that enable to efficiently implement beam sweeping by prioritizing transmission on a first beamformed direction of a plurality of beamformed directions subject to the beam sweeping over transmission on a second beamformed direction of the plurality of beamformed directions. Such techniques may find particular application in the discovery of an access node of the wireless network by a UE attached to the cellular network.

In the illustrated concepts, a device such as the UE is configured to determine, based on at least one spatial information of the device, antenna weights of the plurality of beamformed directions. Alternatively or additionally, the prioritization of the transmission on the first beamformed direction over transmission on the second beamformed direction can depend on the at least one spatial information of the device, e.g., with respect to an access node of the wireless network.

Generally, a wide range of kinds and types of spatial information can be taken into account. One particular spatial information of interest for the techniques described hereinafter is movement of the UE, i.e., a derivative over time of the spatial position. The movement may specify in which direction the UE is traveling. The movement may be characterized by a velocity. Another kind of spatial information of interest is the orientation of the UE. Based on the orientation, it is possible to transform certain parameters of the prioritization such as a preferred spatial direction into a local frame or coordinate system of the UE; this may be part of said determining of the antenna weights. The spatial information may thus sometimes be referred to as spatial coordinate as it defines spatial properties of the UE.

Generally, it is not required that the entire available spatial information is used for, both, the determining of the antenna weights and the prioritization of transmission; e.g., in scenarios it is possible that the orientation of the UE is taken into account when determining the antenna weights while different spatial information such as the movement of the UE is taken into account additionally or alternatively to the orientation when prioritizing transmission.

The techniques described hereinafter can be based on spatial information derived from sensor information such as sensor data from an accelerometer of the UE. The at least one spatial information may be determined by the network and/or by the UE.

The following example illustrates how the at least one spatial information can be used to prioritize the transmission on the first beamformed direction over the transmission on the second beamformed direction. E.g., in an area of dense deployment—such as an urban area—so-called line of sight properties may be expected to be common. Then, a UE can be expected to have an interest in discovery of an access node, e.g., for handover, in a forward direction of the movement of the UE. This may be particularly true in the scenario where the UE moves in-between tall buildings in corridors sometimes referred to as city canyons. Sometimes, however, due to reflections, blocking, or comparable propagation effects, a UE could have an interest in discovering an access node in other directions then the forward direction, e.g., in a backward direction.

Therefore, generally, a search space or scanning sector covered by the beam sweeping may be set to cover all of the surrounding of the UE. Sometimes, the scanning sector may be restricted to a certain solid angle of the surrounding of the UE.

The prioritization can be achieved by implementing probability weights which make it more likely that a directive beam is oriented along the first beamformed direction then an orientation of a directive beam along the second beamformed direction; in other words, a frequency of occurrence of transmission on the first beamformed direction can be higher than the frequency of occurrence on the second beamformed direction. E.g., the degree of such weighing can depend on the velocity of the movement of the UE. E.g., a static UE or a UE with negligible velocity of the movement can weigh all directions equally, e.g., in the horizontal plane; a slowly moving UE can have some preference of the weighing towards the direction of movement; whereas a quickly moving UE can have a comparably strong preference of the weighing towards the forward direction of the movement.

Generally, such techniques as described above and as described hereinafter can be applied to sender and/or receiver beamforming of the UE. Sender beamformed is also known as transmitter beamforming. E.g., in an application of handover, the UE is typically listening for signals to be received from an access node; this corresponds to receiver beamforming. E.g., in an application of access node discovery, the access node may send signals that allow a UE to attach to the access node using sender beamforming.

Thus, generally, as will be appreciated from the above the techniques can be applied to a device that is performing a beam sweep in order to discover a transceiver of interest such as an access node. By means of the techniques described above and hereinafter, discovery of the access node of interest can be facilitated, at least on average, in shorter time, energy consumption can be reduced, and occupation of resources on the spectrum can be reduced. Further, a latency can be reduced, i.e., a delay until a certain action that is dependent on successful discovery of the access node can be reduced; e.g., this may lead to a faster handover.

In FIG. 1, a wireless network 100 according to various embodiments is illustrated. E.g., the wireless network 100 could be a cellular network operating according to the Third Generation Partnership Program (3GPP) Long Term Evolution (LTE) radio access technology or the 3GPP Universal Mobile Telecommunications System (UMTS) radio access technology. It is also possible that the wireless network 100 is a Wi-Fi network is operating according to the Institute of Electrical and Electronics Engineers (IEEE) 802.11 technology. Other cellular radio technologies, e.g., a 5G (5th Generation cellular radio technology) or PAN (Personal Area Network) technology, can also be employed.

The UE 130 is attached to the wireless network 100. In the scenario of FIG. 1, there are three access nodes 121, 122, 123 available for communication with the UE 130 via the radio interface 190 of the wireless network 100. Here, due to the environment 195, transmission of signals between the UE 130 and the access node 122 can be impaired. The access node 123 is implemented by a further mobile UE that provides relay functionality; i.e., the relay access node 123 wirelessly forwards data received from the UE 130 by sending it on to the access node 120 and by further wirelessly forwarding data received from the access node 122 by sending it on to the UE 130.

Now, a scenario is considered where the UE 130 is attached to the wireless network 100 via the access node 121; i.e., data is sent and/or received via the radio interface 190 in between the UE 130 and the access node 121. As the UE moves, it may seek to discover one of the further access nodes 122, 123 (access node discovery). For this, the UE may perform beam sweeping, i.e., sequentially send and/or receive (execute transmission) on a plurality of beamformed directions. The access nodes discovery may comprise at least one of the UE 130 sending and receiving on the radio interface 190.

This is illustrated in FIG. 2. In FIG. 2, the UE 130 performs beam sweeping in order to scan a search space 250 which, in the scenario of FIG. 2, covers the entire surrounding of the UE 130. Exemplarily, a first directive beam 261 which defines a first beamformed direction 251 is illustrated; further, a second directive beam 262 which defines a second beamformed direction 252 is exemplarily illustrated. E.g., the first beamformed direction 251 may be oriented along a center axis of the first directive beam 261.

Generally, the shape and the form of a directive beam 261, 262 employed for the beam sweeping can vary; e.g., an opening angle, a symmetry, or other geometric properties of the directive beam 261, 262 can be varied according to various embodiments by appropriately setting the corresponding antenna weights. The antenna weights may define a magnitude and/or phase of the signal sent and/or received at each individual antenna of the antenna array. E.g., by appropriately weighing a signal, constructive interference (destructive interference) may be achieved for signals sent and/or received at an angle inside (outside) of a corresponding directive beam. Typically, the directive beams 251, 252 may be defined in a global reference frame; then it may be required to take into account the orientation of the UE when determining the antenna weights to appropriately orient the directive beams 261, 262 in a local frame of the UE 130. Here, a coordinate transformation between the local frame and the global reference frame may be implemented.

As can be seen from FIG. 2, the UE 130 has a certain orientation 231 with respect to the access node 122 to be discovered. Also the access node 122 sends and/or receives employing a directive beam 281 oriented along a beamformed direction 271. In order for the UE 130 to successfully discover the access node 122, transmission of the UE 130 for receiving data should be oriented along the first beamformed direction 251 that is complementary to the beamformed direction 271 of the access node 122. To achieve this, transmission on the first beamformed direction 251 can be prioritized over transmission on the second beamformed direction 252 that is not complementary to the beamformed direction 271 of the access node 122. Hereinafter, techniques are described at greater detail that allow to effectively implement such a prioritization of the transmission when beam sweeping (indicated in FIG. 2 by the arrows associated with the first directive beam 261 and the second directive beam 262). The prioritization may occur in the course of a temporal pattern employed for scanning the beamformed directions 251, 252 the search space 250 when beam sweeping.

Generally, such a prioritization of the transmission when beam sweeping can employ at least one of the two following scanning approaches to cover the search space.

SCANNING APPROACH 1: sequential scanning. Here, all of the plurality of the beamformed directions in the search space 250 are scanned in sequence; the temporal pattern may therefore be well-defined from the beginning of the scanning process by a time sequence. E.g., scanning can start with the first beamformed direction 251 assumed to be associated with the highest prioritization. Then, starting with those beamformed directions having second highest prioritization, it is possible to implement a temporal sequence of scanning from high to low prioritization. In such a scenario, it can be assumed that each beamformed direction in the search space 250 is scanned equally many times, e.g., a single time per iteration of the temporal sequence. Thus, such a scenario according to SCANNING APPROACH 1 can be seen as a sorting of beamformed directions 251, 252 into the temporal sequence according to the prioritization and scanning the temporal sequence starting from the highest priority.

SCANNING APPROACH 2: non-sequential scanning. Here, such beamformed directions having higher prioritization are scanned more often on average than such beamformed directions having a lower prioritization. A strict time sequence may not be required; the temporal pattern may be determined from each scanning step to the next or, e.g., for a few scanning steps ahead. Generally, various techniques of implementing such a non-sequential scanning are conceivable. One technique is to select the next beamformed direction to be scanned independently of any beamformed directions scanned previously by considering probability weights associated with each beamformed direction. Thereby, a random temporal pattern of transmission on the plurality of beamformed directions 251, 252 in the search space 250 can be achieved where the frequency of occurrence of transmission on each one of the plurality of beamformed directions 251, 252 is adjusted by a selection process that takes into account a likelihood or probability wait for each one of the plurality of beamformed directions 251, 252.

SCANNING APPROACH 1 and SCANNING APPROACH 2 can be combined. Such a technique can also consider a history of the scanning, e.g., by implementing a minimum time of rescanning a given beamformed direction 251, 252. It would also be possible to ensure by some means that low a weighted beamformed directions 251, 252 are scanned from time to time. In that sense, a temporal pattern of transmission on the plurality of beamformed directions 251, 252 can be partly random. In such combined techniques, generally a predefined variation between neighbors in the temporal sequence may therefore be taken into account; the predefined variation may relate to a minimum difference in the orientation of the neighboring beamformed directions; next-neighbors or second-next-neighbors, etc., may be considered.

FIGS. 3-6 are polar plots illustrating a frequency of occurrence 300 of different beamformed directions in the search space 250; FIGS. 3-6 correspond to a two-dimensional cross-sectional cut through the three-dimensional search space 250, e.g., in the horizontal plane. In FIGS. 3-6, probability weights may be set according to the frequency of occurrence 300; a higher (lower) frequency of occurrence 300 can be associated with higher (lower) probability weights. For sake of simplicity, units of the frequency of occurrence 300 in FIGS. 3-6 are normalized to unity.

Figures 3, 4:
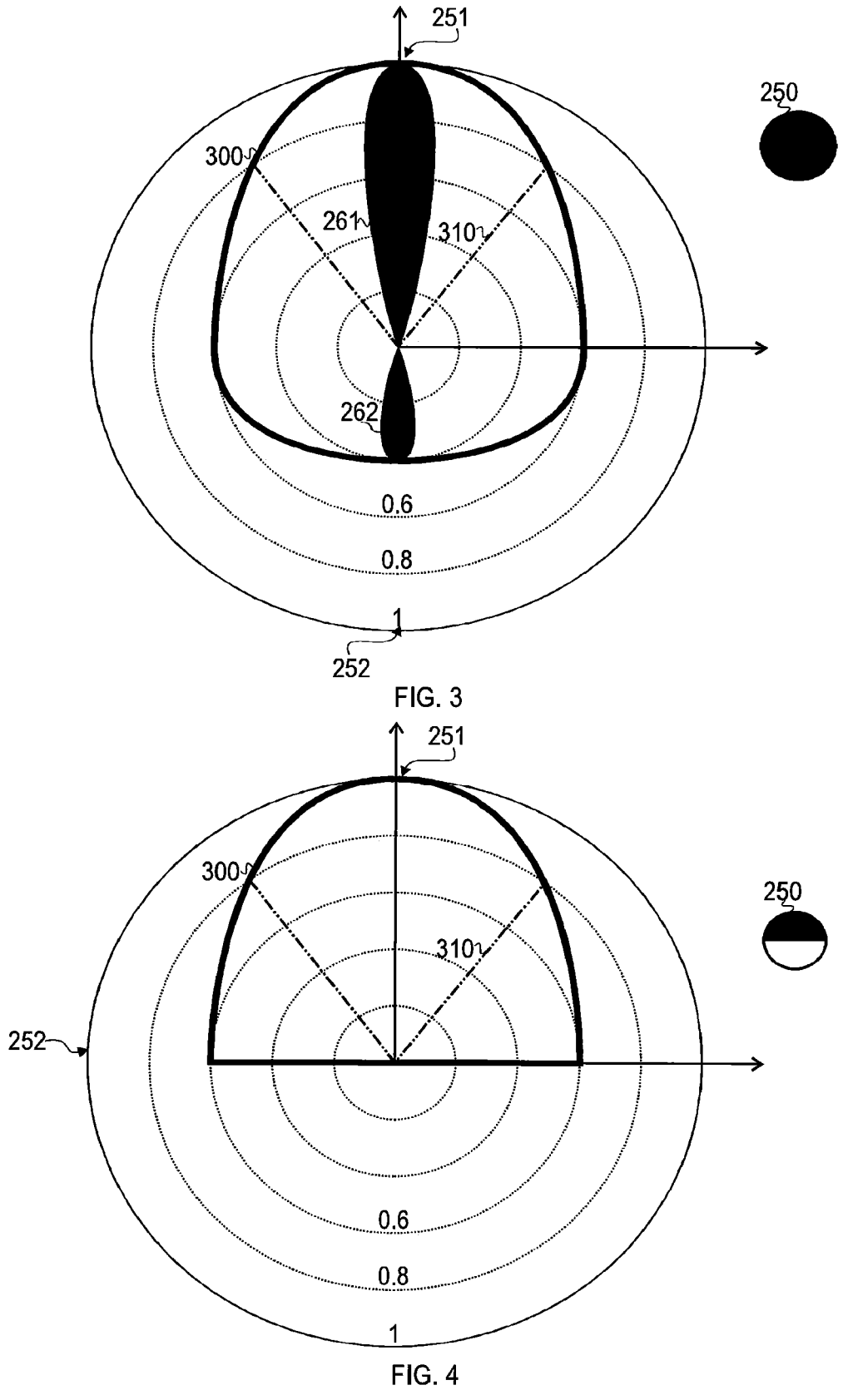
FIG. 3 is a polar plot of the frequency of occurrence of transmission of the UE on beamformed directions according to various embodiments, wherein the first directive beam and the second directive beam are highlighted.
FIG. 4 is a polar plot of the frequency of occurrence of transmission of the UE on beamformed directions according to various embodiments.

In the scenario of FIG. 3, the search space 250 covers 360° around the UE 130, i.e., covers the entire surrounding of the UE 130. Exemplarily, in FIG. 3, the first directive beam 261 corresponding to the first beamformed direction 251 is illustrated; likewise, in FIG. 3, the second directive beam 262 of the second beamformed direction 252 is illustrated. As can be seen from FIG. 3, the first beamformed direction 251 has the highest frequency of occurrence 300 of all beamformed directions in the search space 250; in particular, a frequency of occurrence 300 of the second beamformed direction 252 only amounts to about 0.4 of the frequency of occurrence 300 of the first beamformed direction 251. Thereby, on average, it can be assumed that the first beamformed direction 251 is scanned more than twice as often during the beam sweep as the second beamformed direction 252. Such a prioritization of the first beamformed direction 251 over the second beamformed direction 252 can be achieved by setting the corresponding probability weight of the first beamformed direction 251 to correspond to a large a probability of sending and/or receiving on the first beamformed direction 251 than the probability weight of the second beamformed direction 252.

In the scenario of FIG. 4, the search space 250 amounts to only 180° of the surrounding of the UE 130. E.g., the search space 250 could be limited to the forward-oriented hemisphere of the moving UE 130. Again, the first beamformed direction 251 has a higher frequency of occurrence 300 if compared to the second beamformed direction 252.

In the scenarios of FIGS. 3 and 4, it is possible to employ a purely random pattern of transmission on the plurality of beamformed directions 251, 252 in the search space 250. I.e., from each scanning step to the next, based on corresponding probability weights the respective beamformed direction 251, 252 can be determined. This corresponds to the SCANNING APPROACH 2 as discussed above.

Figures 5, 6:
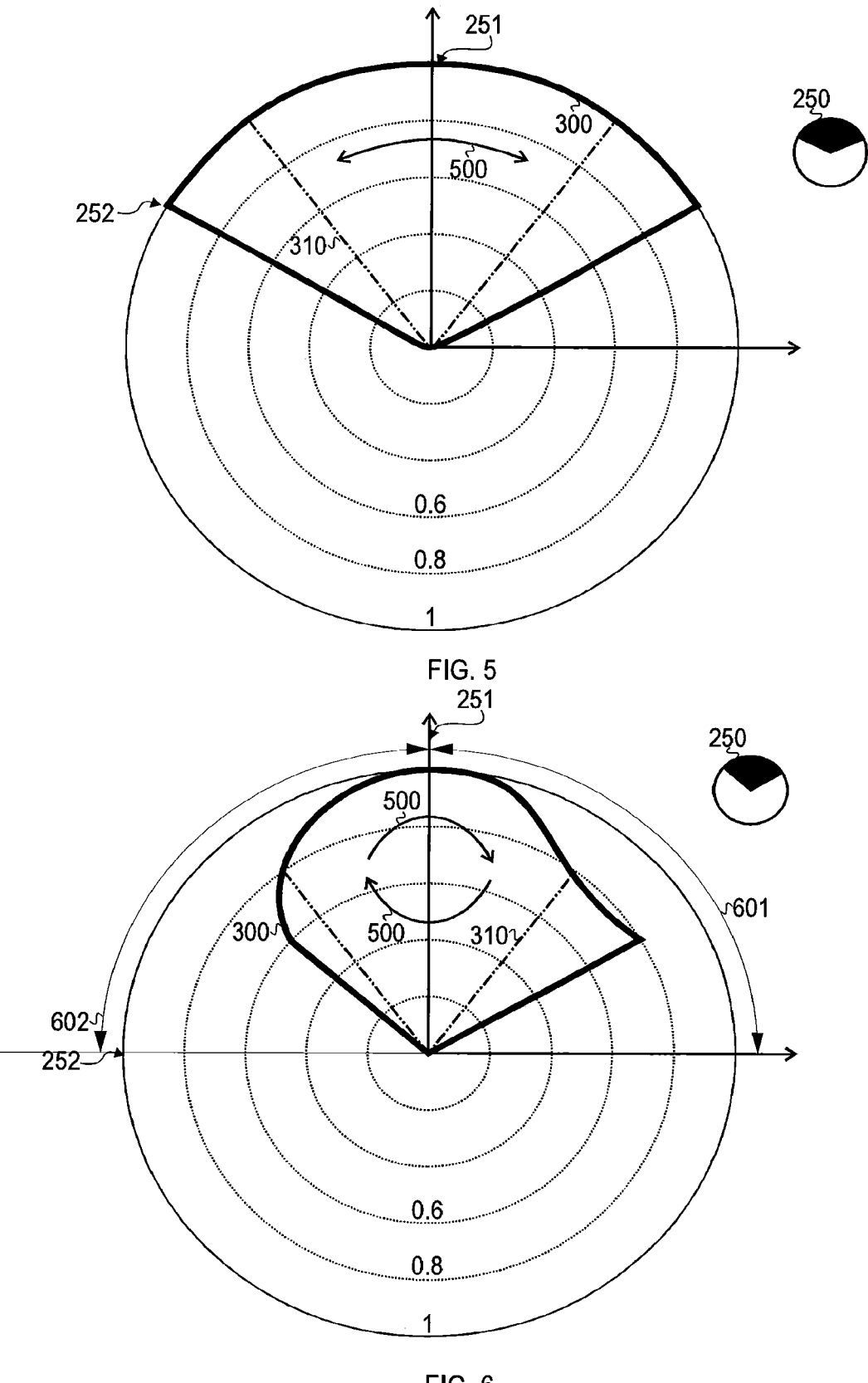
FIG. 5 is a polar plot of the frequency of occurrence of transmission of the UE on beamformed directions according to various embodiments, wherein a temporal sequence of transmission on the beamformed directions is further illustrated.
FIG. 6 is a polar plot of the frequency of occurrence of transmission of the UE on beamformed directions according to various embodiments, wherein a temporal sequence of transmission on the beamformed directions is further illustrated.

An implementation of the SCANNING APPROACH 1 as presented above is illustrated in FIG. 5. Here, a prioritization of the transmission on the first beamformed direction 251 over transmission on the second beamformed direction 252 is achieved by arranging the first beamformed direction 251 before the second beamformed direction 252 and a temporal sequence 500 of transmission on the plurality of beamformed directions in the search space 250. As can be seen from FIG. 5, the frequency of occurrence 300 is alike for all directions in the search space 250. Therefore, a prioritization of the first beamformed direction 251 over the second beamformed direction 252 is not achieved by more often sending and/or receiving on the first beamformed direction 251 if compared to transmission on the second beamformed direction 252; rather, the prioritization is achieved by starting the scanning at the first beamformed direction 251 (in FIG. 5, an order of temporal sequence 500 is illustrated by the arrows).

An implementation of a combination of SCANNING APPROACHES 1 and 2 as presented above is illustrated in FIG. 6. In the scenario of FIG. 6, the temporal sequence 500 is not strictly predefined before scanning the search space 250. Rather, a rule is applied, e.g., on-the-fly when beam sweeping, to obtain a partly random temporal pattern of transmission on the plurality of beamformed directions 251, 252 of the search space; here, the rule ensures a predefined variation between next-neighbors in the temporal sequence 500. In detail, in the scenario of FIG. 6, said rule specifies that beamformed directions 251, 252 arranged in different sectors 601, 602 of the surrounding of the UE 130 are alternately scanned; i.e., next-neighbor beamformed directions are arranged at a certain distance with respect to each other. In other words, in the scenario of FIG. 6 beamformed directions arranged left and right of the vertical axis could be alternately scanned (indicated by the two arrows of the temporal sequence 500 in FIG. 6). Thus, while no strict temporal sequence 500 is a priori defined, still some degree of ordering of the temporal pattern of the scanning of the beamformed directions 251, 252 in the search space 250 is achieved by building the temporal sequence 500 while scanning with some random contribution and some ordering.

Generally, different predefined variations between neighbors in the temporal sequence 500 could be considered. E.g., certain predefined variations between next-neighbors, second next-neighbors, etc. could be implemented. E.g., a certain predefined variation may require that a given beamformed direction is not re-scanned for a certain timeout duration and/or for a certain number of scanning iterations of further beamformed directions; such a scenario may be referred to as taboo depth.

In FIGS. 3-6, the first beamformed direction 251 having the highest prioritization has been illustrated to be arranged along the top vertical axis; e.g., a direction of movement of the UE 130 could be also arranged along the top vertical axis. Generally, in order to appropriately determine the antenna weights of the plurality of beamformed directions, it may be required to accurately determine the orientation 231 of the UE 130. Then, once the orientation of the UE 130 with respect to the various beamformed directions 251, 252 is known, corresponding antenna weights can be determined. Such techniques may allow for a dynamic adaptation of the beamforming—even if the user handles the UE 130 which thus typically changes its position and orientation over the course of time.

As can be seen from FIGS. 3-6, a prioritization of the various beamformed directions in the search space 250 decreases from the first beamformed direction 251 to the second beamformed direction 252. To simplify illustration, in FIGS. 3-6 a so-called preferred sector 310 is illustrated (by the dotted-dotted-dashed line); the preferred sector 310, in the example scenarios of FIGS. 3-6, includes those beamformed directions of the scanning sector 250 which have the 20% highest priorities. Generally, the preferred sector 310 can correspond to a sector of the surrounding of the UE 130 where corresponding beamformed directions have a comparably high prioritization.

Above, aspects of the dynamic beamforming have been explained where depending on an orientation of the UE 130 antenna weights are adapted to efficiently implement a beam sweeping in the scanning sector 250 even when the UE 130 moves and changes its orientation; for example, such a dynamic adaptation of the antenna weights can occur while the temporal pattern of the scanning remains fixed. However, in addition it is also possible to dynamically adapt the temporal pattern of the scanning; e.g., while it would be feasible to start the scanning having a isotropic scanning sector 250 (see FIG. 3), it may be desirable to narrow down the scanning sector 250 over the course of the scanning where additional information may become available which increases a confidence level that the access node 121-123 is discovered in a certain direction (see FIGS. 4-6). In another scenario, a quantitative dependency of the frequency of occurrence 300 may be adjusted over the course of time. In another scenario, and orientation of the preferred sector 310 can be dynamically adjusted over the course of time.

Figure 7:
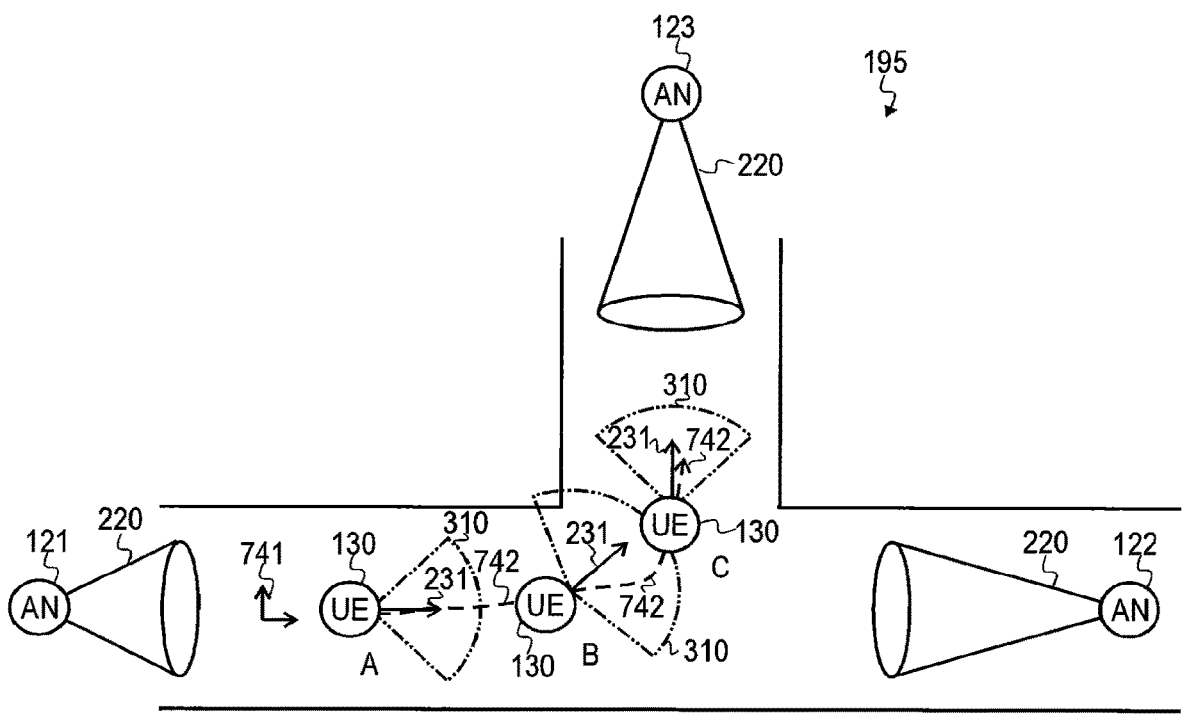
FIG. 7 schematically illustrates a dynamic adaptation of a preferred sector of transmission as the UE moves through the environment.

Such a scenario of adjusting the preferred sector 310 over the course of time as the UE 130 moves is explained hereinafter with respect to FIG. 7. FIG. 7 illustrates a scenario where the UE 130 moves along the corridor defined by the environment 195. E.g., the corridor may be defined by tall buildings in a city. "A" indicates a position of the UE 130 where the UE 130 is attached to the first access node 121 (serving access node) via the radio interface 190; depending on a spatial information 195, 231, 741, 742 of the UE 130, the preferred sector 310 (illustrated in FIG. 7 by the dotted-dotted-dashed line) is adjusted/determined.

Generally, the temporal pattern of the prioritization and, thereby, the preferred sector 310 can be determined by the UE 130 and/or a network node of the wireless network 100, e.g., by the serving access node 121. E.g., the network node may determine a preferred spatial direction which, e.g., unambiguously or with some ambiguity, defines the preferred sector 310. Further parameters required to define the preferred sector 310 may be an opening angle, other geometric properties, a rule defining the temporal sequence 500, and/or the frequency of occurrence 300.

E.g., the preferred sector 310 may be centered around a preferred spatial direction; for simplicity, therefore, hereinafter the preferred sector 310 and the preferred spatial direction are both denoted by reference numeral 310. The preferred spatial direction 310 can be a direction where it is expected at a high likelihood that the access node may be discovered. As such, the wireless network 100 may signal the preferred spatial direction 310 to the UE 130 which may then, based on the preferred spatial direction 310, determine the temporal pattern of scanning and, thereby, the preferred sector 310 (cf. FIGS. 3-6); it is also possible that the wireless network 100 signals the entire temporal pattern and, therefore, the preferred sector 310—also in such a scenario the signaling is indicative of the preferred spatial direction 310, at least implicitly via the prioritization of the corresponding beamformed directions. The preferred spatial direction 310 may therefore be seen as a parameter indicative of the temporal pattern; it may or may not include all information required to build the temporal pattern of prioritization.

As mentioned above, depending on the distribution of logic, the UE 130 can determine the preferred spatial direction 310 on its own or may receive a control message from the wireless network 100 which indicates explicitly or implicitly the preferred spatial direction 310. Based on the preferred spatial direction 310, the UE 130 may determine the temporal sequence 500 of transmission on the plurality of beamformed directions 251, 252 and/or the frequency of occurrence 300 of transmission on each one of the plurality of beamformed directions 251, 252; hence, the UE 130 may determine the temporal pattern providing the prioritization. In a simple scenario it is also possible that the wireless network 100 pre-determines the temporal sequence 500 and/or the frequency of occurrence 300. Also such data may be indicated in the control message.

As can be seen from the above, a distribution of logic to control the beam sweeping may be fully or partly resides in the UE 130; at least parts of the logic to control the beam sweeping may also reside in the wireless network 100.

Generally, various kinds and types of spatial information 195, 231, 741, 742 of the UE 130 can be taken into account when prioritizing transmission on the beamformed directions 251, 252, i.e., when determining the preferred spatial direction 310 and/or the temporal pattern. E.g., a relative position 741 of the UE 130 with respect to one of the access nodes 121-123 can be taken into account; alternatively or additionally, a relative movement 742 (indicated in FIG. 7 by the dashed line) of the UE 130 with respect to one of the access nodes 121-123 can be taken into account; alternatively or additionally, it is also possible to take into account the orientation 231 (indicated in FIG. 7 by the full arrows) of the UE 130 with respect to one of the access nodes 121-123 at this step. Further, as explained above with respect to FIG. 7, the spatial information can also indicate the environment 195 of the UE 130; e.g., the spatial information may indicate a topology of the environment 195. From the environment 195 the signal path of the signal sent and/or received in between one of the access nodes 121-123 and the UE 130 may be predicted. It becomes possible to take into account reflections, multipath transmission, etc.

Logic of determining the spatial information 195, 231, 741, 742 of the UE 130 can reside fully or partly in the UE 130 and/or can reside fully or partly in the wireless network 100. E.g., it may be possible that sensor data of the UE 130 is employed to determine at least parts of the spatial information 195, 231, 741, 742. Likewise, it is possible that properties of the radio interface 190 are measured and evaluated by logic residing in the wireless network 100; from this, it may be possible to determine at least parts of the spatial information 195, 231, 741, 742 of the UE 130. Then, it is possible that a control message is sent from the network 100 and received by the UE 130 which indicates at least parts of the spatial information 195, 231, 741, 742.

Now referring again to FIG. 7, at position "A", based on the spatial information 195, 231, 741, 742, the prioritization of transmission on the various beamformed directions is set such that the preferred sector 310 is obtained that points in the forward direction of the movement 742 of the UE 130 covering all possible reflection paths of signals sent by the access node 122 and the access node 123. In this respect, it is noted that the illustration of FIG. 7 is a projection into two dimensions and that—as explained above—the preferred sector 310 can define a three-dimensional solid angle in the surrounding of the UE 130.

Sometime later, the UE 130 has reached position "B". At position "B", the UE 130 has moved towards the three-way intersection of the corridor (illustrated in the center of FIG. 7). Because of this, the temporal pattern of the prioritization of the various beamformed directions is adapted such that the preferred sector 310 is expanded or widened; this is done to take into account all possible angles of reception of handover signaling sent by the access node 122 and the access node 123.

Already at position "B", the UE 130 changes its orientation 231 so that it faces towards a direction in which the access node 123 is located. Because of this, a handover from the access node 121 to the access node 123 can be preferred over a handover from the access node 121 to the access node 122—as it is more likely that the UE 130 continues to move towards the access node 123. Because of this, in position "C"—where it is confirmed, based on the movement 742 of the UE 130, that the UE 130 moves towards the access node 123—the preferred sector 310 is narrowed to selectively cover all possible angles of reception of the handover control signaling sent by the access node 123.

It is noted that in the illustration above, the preferred sector 310 has been determined based on the assumption that reflection of the handover control signaling received by the UE 130 from a rearward direction of the movement 742 are less likely if compared to reception of the handover control signaling in angles centered around the forward direction of the movement 742. Where required, it would also be possible to appropriately set the prioritization of the beamformed transmissions in the scanning sector 250 such that two or more, e.g., non-overlapping, preferred sectors 310 are defined.

Figure 8:
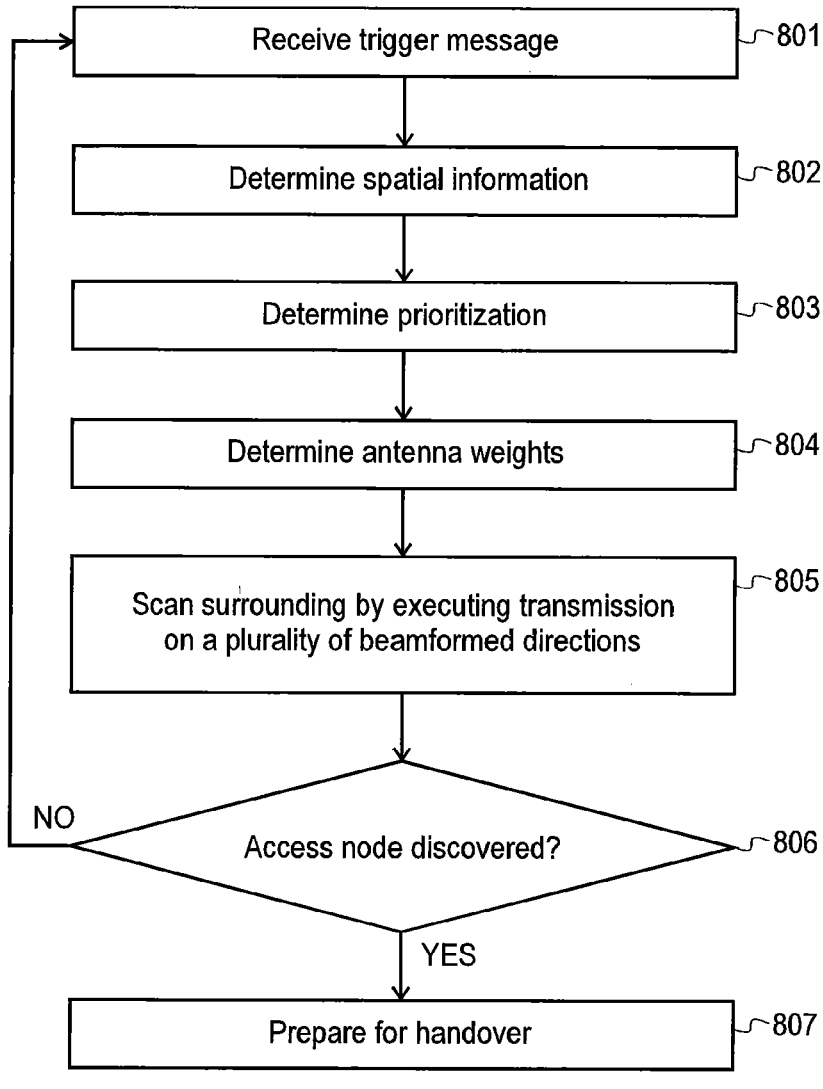
FIG. 8 is a flowchart of a method according to various embodiments.

As mentioned above, a distribution of logic of determining the prioritization of the plurality of beamformed directions can be flexibly shifted in between the UE 130 and the network 100. In FIG. 8, a flowchart of a method according to various embodiments is illustrated where the prioritization of the plurality of beamformed directions 251, 252 is executed by the UE 130. In the scenario FIG. 8, the prioritization of receiver beamforming directions is employed for the search for handover relevant information.

At 801, the procedure is triggered by a control message received from the network 100. This control message does not need to indicate, e.g., the preferred spatial direction 310 or other parameters that enable the UE 130 to determine the temporal pattern providing for the prioritization.

In another scenario, the procedure may be triggered by link failure, i.e., by the UE 130 not receiving an explicit control message from the network 100, but rather discovering that the current link is degraded or lost; then, a handover to another access node 122, 123 would be required or preferable.

At 802, the UE 130 determines the spatial information 195, 231, 741, 742. The spatial information includes the position 741 of the UE 130, the orientation 231 of the UE 130, a direction of the movement 742 of the UE 130, etc. Generally, various scenarios are conceivable to determine at least parts of the spatial information 195, 231, 741, 742. E.g., the UE 130 may collect data and/or perform the required measurements based on internal sensors; e.g., a gyroscope could be used to determine the orientation 231; e.g., a global positioning system (GPS) sensor could be used to determine the position 741. Alternatively or additionally, the UE 130 could send a respective control message (spatial information request) to the network 100 which prompts the cellular network 100 to provide at least parts of the spatial information. Then, the UE 130 could receive a respective control message (spatial information response) that includes at least parts of the spatial information. At 802, techniques of sensor fusion can be employed; e.g., spatial information 195, 231, 741, 742 from various sources may be collected and combined to achieve a better estimation; here, measurement combination techniques according to various reference implementations may be implemented in order to reduce uncertainties in the estimates.

At 803, the prioritization of the different beamformed directions is executed. E.g., the prioritization of the different beamformed directions can be achieved by appropriately setting the frequency of occurrence 300 and/or by appropriately setting the temporal sequence 500. E.g., at 803, relative probability weights may be set for the different beamformed directions 251, 252. It is not required to a-priori set the specific temporal sequence 500 at 803, i.e., before the beam sweeping is executed.

At 804, the orientation 231 of the UE 130 is determined—if not already done so, e.g., as part of 802. Then, the orientation 231 is used to find the up direction and the rotation of the UE 130 with respect to, e.g., the serving access node 121. More generally, at 804, a valid reference frame may be found in which different directions such as the preferred spatial direction 310, the scanning sector 250, the preferred sector 310, and the various beamformed directions 251, 252 may be specified. E.g., a movement vector or velocity vector may be expressed in the determined reference frame. Such information may be used to absolutely orient and arrange the differently prioritized beamformed directions 251, 252, i.e., the preferred sector 310.

Where required, it is also possible that up-to-date information on the orientation 231 of the UE 130 is used to transform such properties of the prioritization as mentioned above into the local coordinate system of the UE 130. In the local coordinate system, it may be possible to determine the antenna weights of the different antennas of the antenna array of the UE 130 at 804.

At 805, the scanning sector 250 is scanned by sending and/or receiving on a plurality of beamformed directions 251, 252. E.g., in the handover scenario, the UE can receive handover control signaling which may be sent in a broadcast transmission by the corresponding access node 122, 123. Generally, it is possible that the scanning of the plurality of beamformed directions 251, 252 is executed serially or at least partly in parallel; i.e., it is possible that transmission occurs at least in parallel on different beamformed directions 251, 252.

At 806, it is checked whether handover control information has been successfully received at 805. If handover control information has been successfully received, the UE 130 may take preparatory actions for initializing the handover at 807; such actions may be according to various reference implementations. If, however, no handover control signaling has been received, 801 may be executed anew, i.e., the UE 130 may wait for a new trigger from the wireless network 100 to reinitialize the procedure.

Generally, it is possible that during beam sweeping at 805 the antenna weights are adjusted according to 804, e.g., if the orientation of the UE 130 changes.

Figure 9:
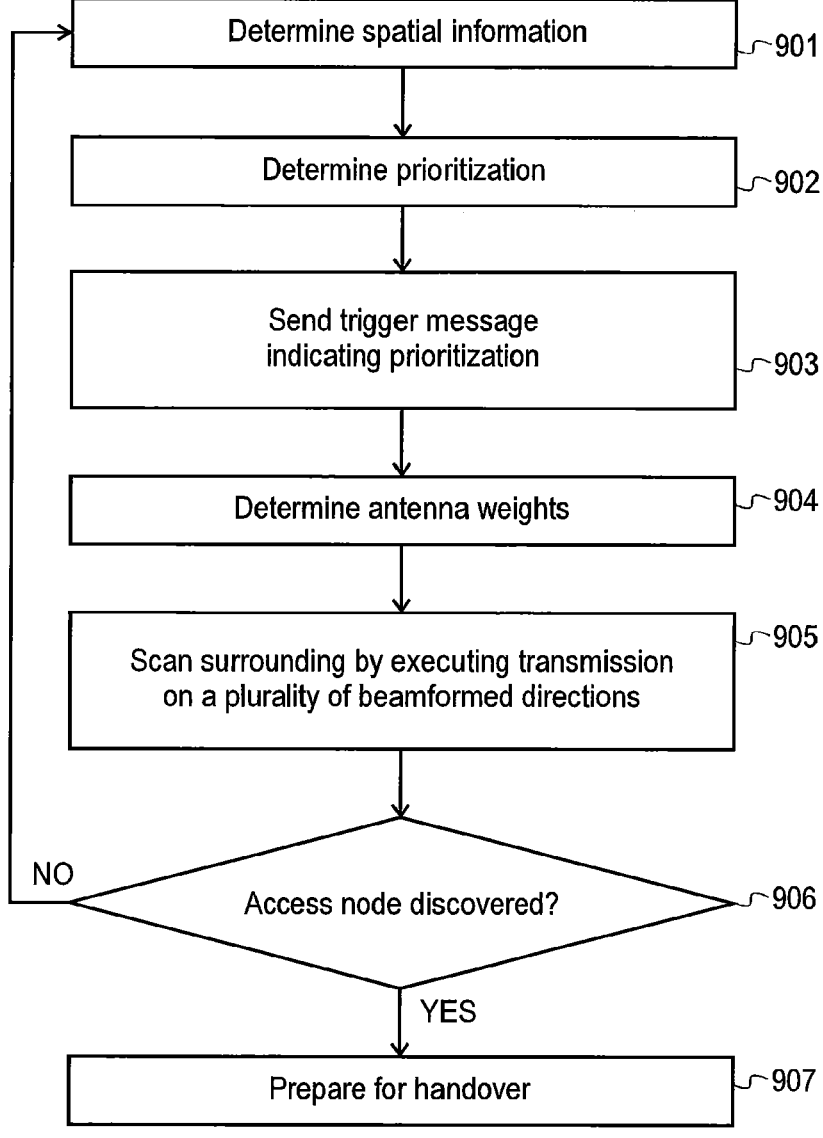
FIG. 9 is a flowchart of a method according to various embodiments.

In FIG. 9, a flowchart of a method according to various embodiments is illustrated where at least some of the parameters for the prioritization of the transmission on the plurality of beamformed directions in the search space 250 are determined by the network 100. E.g., the serving access node 121 can be configured to determine parameters of the prioritization depending on a spatial information 195, 231, 741, 742 of the UE 130; alternatively or additionally, a different network node, e.g., a network node located in the core network of the wireless network 100 being a cellular network may execute corresponding tasks. Then, corresponding information can be sent as a control message to the UE 130. In a simple scenario the preferred spatial direction 310 is explicitly indicated to the UE 130; then the UE 130 may build the temporal pattern upon this, e.g., by appropriately setting the temporal sequence 500 and/or the frequency of occurrence 300. It is also possible that the preferred spatial direction 310 is implicitly indicated to the UE 130, e.g., by indicating the temporal sequence 500 and/or the frequency of occurrence 300 directly.

If the wireless network 100 determines the preferred spatial direction 310, generally, different formats may be used to indicate the preferred spatial direction. In a simple embodiment, the preferred spatial direction 310 may be specified by a vector; the vector may be defined in different coordinate systems, e.g., at azimuth and elevation angles; a global frame may be used which is independent of the orientation 231 of the UE 130. Where the preferred spatial direction 310 is determined by means of the preferred sector 310, it may be possible to specify the opening angle of the preferred sector 310. Hence, in various embodiments a total of 3 float numbers per preferred spatial direction 310 can be specified. For a larger number of preferred spatial directions 310, a corresponding the larger number of values can be provided. It is possible to employ reference implementations of compression techniques to further reduce the signaling overhead between the wireless network 100 and the UE 130; this may be in particular true for a scenario where the logic for determining the prioritization resides at least partly in the wireless network 100.

It is possible that the wireless network 100 indicates the preferred spatial direction 310, implicitly or explicitly, in a global reference frame; transformation into the local frame of the UE 130 may then be required based on the orientation of the UE 130.

E.g., it is possible that the determining of the parameters of the prioritization depends on the location and previous experience of served UEs at the location of the UE 130. In that sense, self-learning techniques may be implemented in order to accurately determine the prioritization. Previous handover events may be taken into account. Then, it may become possible to determine the preferred spatial direction 310 such that a likelihood of a successful handover is increased.

Again, various spatial information 195, 231, 741, 742 may be employed such as the position 741, the movement 742, and the environment 195. Based on such spatial information 195, 231, 741, 742, the temporal sequence 500 and/or the frequency of occurrence 300 can be determined; alternatively or additionally, the wireless network 100 may only determine a preferred direction, send a corresponding control message which indicates such parameters to the UE 130 so that the UE can determine the temporal sequence 500 and/or the frequency of occurrence 300. In any case, the UE 130 may transform such parameters from a global reference frame into a local frame based on its orientation 231. Details of such techniques are explained below with reference to FIG. 9; here for sake of simplicity and for illustrative purposes only it is assumed that the corresponding functionality is implemented by the access node 121 serving the UE 130.

At 901, the access node 121 determines the spatial information 195, 231, 741, 742 of the UE 130. E.g., the access node 121 could determine the spatial information 195, 231, 741, 742 based on network positioning measurements; e.g., the movement 742 may be determined as a derivative over time of the position 741. Alternatively or additionally, the access node 121 may also receive a status report from the UE 130 which at least partly indicates the spatial information 195, 231, 741, 742.

At 902, the access node 121 determines the preferred spatial direction 310 depending on the spatial information of the UE 130. Additionally, it is possible that, at 902, the access node 121 also determines the specific prioritization of the various beamformed directions 251, 252; e.g., it is possible that the access node 121 determines the frequency of occurrence 300 and/or the temporal sequence 500.

E.g., at 902, the position 741 of the UE 130—e.g., expressed in the reference coordinate system—can be used together with a locally available three-dimensional map of the environment 195 to estimate those directions in the surrounding of the UE 130 where reception of handover control information by the UE 130 is most likely to occur. This allows to determine if, e.g., a reflecting wall is likely to reflect handover control information sent by a nearby access node 122, 123, e.g., in a broadcast transmission. From such information, the access node 121 constructs one or more preferred spatial directions 310 from which it is more likely for the UE 130 to receive the handover control signaling.

Additionally or alternatively, at 902, the access node 121 may consider historic information on locations of UEs and/or statistics on handover behavior of UEs such as a success rate of handovers for UEs in the current location. Such information may thus relate to previous handover events. In particular, it may be possible to take into account previous handover events that occurred at positions that are close to a current position of the UE 130.

Additionally or alternatively, at 902, the access node 121 may select one or more of available handover access nodes 122, 123 from available candidate handover nodes based on a likelihood that handover to a given access node 122, 123 is desired/is successful. E.g., based on the orientation 231 and/or the movement (historic path/trajectory, velocity, and current direction of movement) 742 of the UE 130, it can be predicted where the UE, in the near future, will be positioned. This may allow discarding some of the candidate handover access nodes 122, 123 that are more remote or otherwise unsuitable to the estimated near future position of the UE 130.

Additionally or alternatively, at 902, an opening cone of the preferred sector 310 may depend on a velocity of the movement 742 of the UE 130. E.g., for larger (smaller) velocities of the movement 742 of the UE 130, a smaller (larger) opening cone of the preferred sector 310 may be selected.

As will be appreciated, from one or more of the techniques as explained above, one or more preferred spatial directions 310 can be determined.

Next, at 903, a control message prompting the UE 130 to successively execute transmission on the plurality of beamformed directions 251, 252 is sent by the access node 121. The control message can indicate the preferred spatial direction 310; if prioritization of the various beamformed directions 251, 252 have been determined at greater detail at 902, respective information may be included in the control message—such information may be implicitly indicative of the preferred spatial direction 310.

At 904, e.g., based on internal sensor data, the UE 130 determines its orientation 231. This allows transforming the information received as part of the control message at 903 into a local frame. E.g., at 904, the UE 130 may transform the preferred spatial direction 310 into the local coordinate system depending on its orientation 231. In the local coordinate system, it may be possible to determine the antenna weights of the different antennas of the antenna array of the UE 130 at 904.

905-907 correspond to 805-807.

In such a scenario, information on the environment 195 may be considered by the access node 121; in particular, if compared to a scenario where the respective logic of the determining of the prioritization resides within the UE 130, it may not be required to provide correspondingly complex data on the environment 195 in the UE 130. Thus, it may not be required to provide comparably large computational resources at the UE 130.

Figure 10:
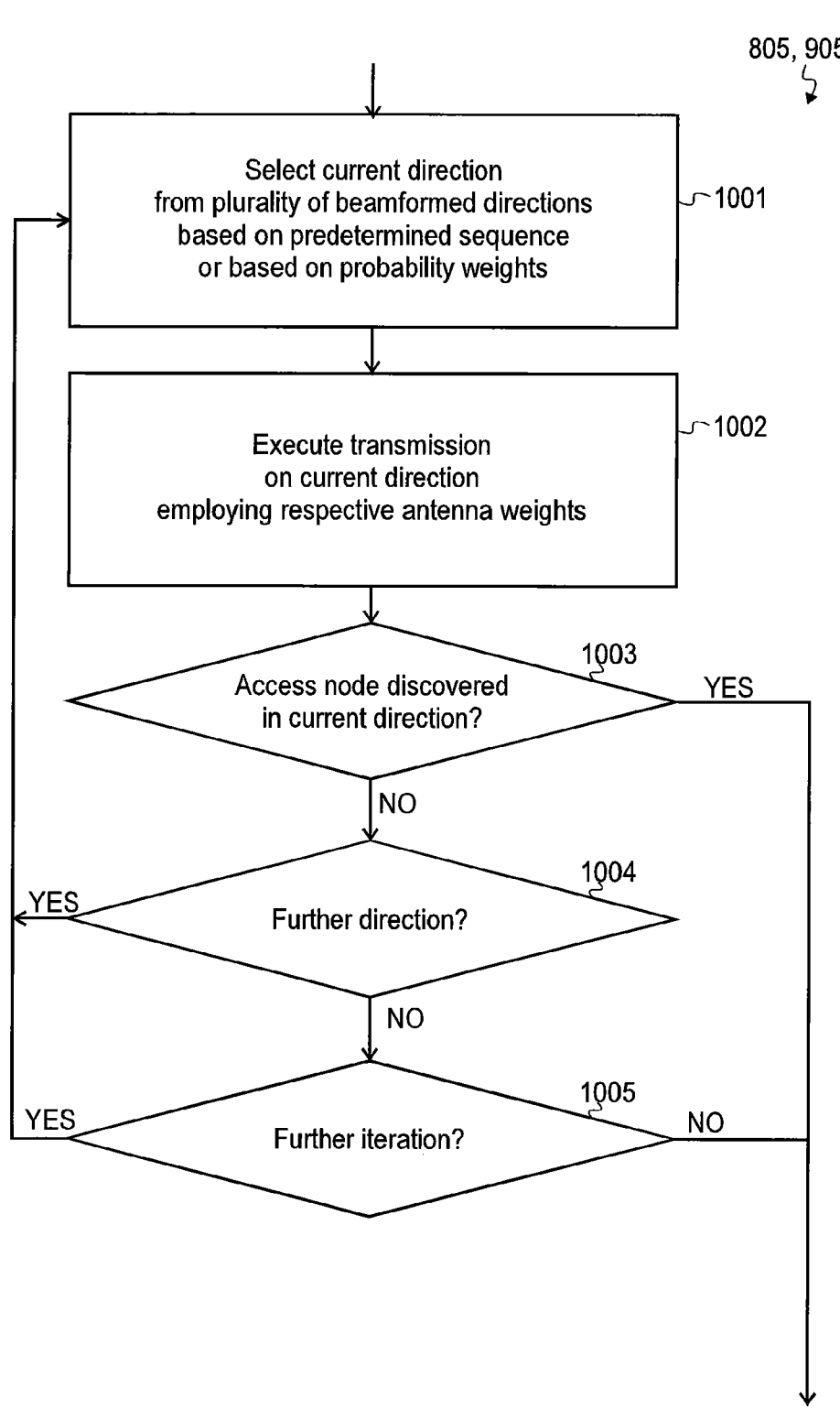
FIG. 10 is a flowchart of a method according to various embodiments, wherein aspects of a scanning of the surrounding of the UE by employing prioritization of beamformed directions are illustrated in greater detail.

Turning to FIG. 10, the scanning of the surrounding of the UE 130 at 805 and 905 is illustrated at greater detail. Generally, as mentioned above, the beam sweeping may employ SCANNING APPROACH 1 and/or SCANNING APPROACH 2 as discussed above; i.e., the beam sweeping may employ the temporal sequence 500 and/or the varying frequency of occurrence 300 by implementing probability weights.

At 1001, a current beamformed direction is selected which resides within the scanning sector 250. Here, the selection can be based on the temporal sequence 500 and/or the probability weights.

At 1002, the UE 130 sends and/or receives signals on the current direction employing the respective antenna weights; i.e., at 1002, a directive beam defining the current beamformed directions is employed.

At 1003, it is checked whether the transmission and/or reception of signals at 1002 discovered an access node 122, 123 other than the serving access node 121; if this is the case, the loop is aborted and preparatory actions for the handover can be taken. If this is not the case, at 1004 it is checked whether a further beamformed direction to be scanned is available; if this is the case, the further beamformed direction to be scanned is selected as the current beamformed direction at 1001.

Otherwise—i.e., if the entire search space 250 has been scanned—, at 1005 it is checked whether a further iteration of the scanning should be executed. E.g., a parameter may specify the how many iterations should be executed at 1005. If a further iteration is required, than the search space 250 is scanned anew.

As mentioned above, a certain frequency of occurrence 300 may be implemented by means of probability weights. Turning to FIG. 11, an embodiment is illustrated where probability weights 1100 are exemplarily depicted for a comparably wide preferred sector 310. FIG. 11 illustrates the probability weights 1100 for different discretized angles; considering that the different angles are enumerated by the indices (j, k), the probability weights 1100 may be obtained by the following equation:

$$w(j, k) = \frac{1}{v\sqrt{(j - J)^2 + (k - K)^2}}$$

Where (J, K) specifies the angle in which the UE 130 is moving, e.g., by azimuth and elevation angles for this direction, and v is a velocity factor which is one for a static UE 130 and which increases with the velocity. As can be seen from Eq. 1, in case of a static UE, the frequency of occurrence 300, respectively the probability weights 1100 are equal for all directions in the surrounding of the UE. FIG. 11 is an example of a 5×5 angle grid wherein Eq. 1 is applied with velocity factor v=2. FIG. 12 is the corresponding example with v=4. Here, the center (j,k)=(3, 3) with a probability weight 1100=1,0 is the preferred spatial direction which is oriented in parallel to the direction of the movement 742 of the UE 130. In FIGS. 11 and 12, columns indicate horizontal angles with respect to the preferred direction; rows indicate a vertical angle with respect to the preferred direction. As can be seen from a comparison of FIGS. 11 of and 12, with a velocity factor of 2 (FIG. 11) the direction next to the preferred direction 310 is weighed with the factor of 0.5, i.e., a frequency of occurrence 300 of the corresponding beamformed direction is half as large as the frequency of occurrence 300 of the beamformed direction that is oriented along the preferred direction 310.

As mentioned above, in different scenarios the probability weights 1100 can be employed in different manners. In one scenario, the selection of the next beamformed direction is based on the probability weights 1100 by a random selection process where a likelihood of selecting a specific beamformed direction is proportional to its probability weight 1100. In a further scenario, a taboo depth of M is introduced; i.e., a certain beamformed direction cannot be selected for transmission if it was selected previously and M further beamformed directions have not been selected since; e.g., consider the following scenario where M=3: the beam selection (j,k)=(3, 3), (2, 3), (4, 4), (3, 3) would not be allowed, because they are need to be at least transmission on M=3 further beamformed directions before (j,k)=(3, 3) is re-selected. As can be seen, in such a scenario the temporal pattern of transmission on the beamformed direction depends on the history of transmissions. Such techniques allow to homogeneously and quickly scan the entire search space 250; quick discovery of access nodes 122, 123 may be facilitated.

Figure 13:
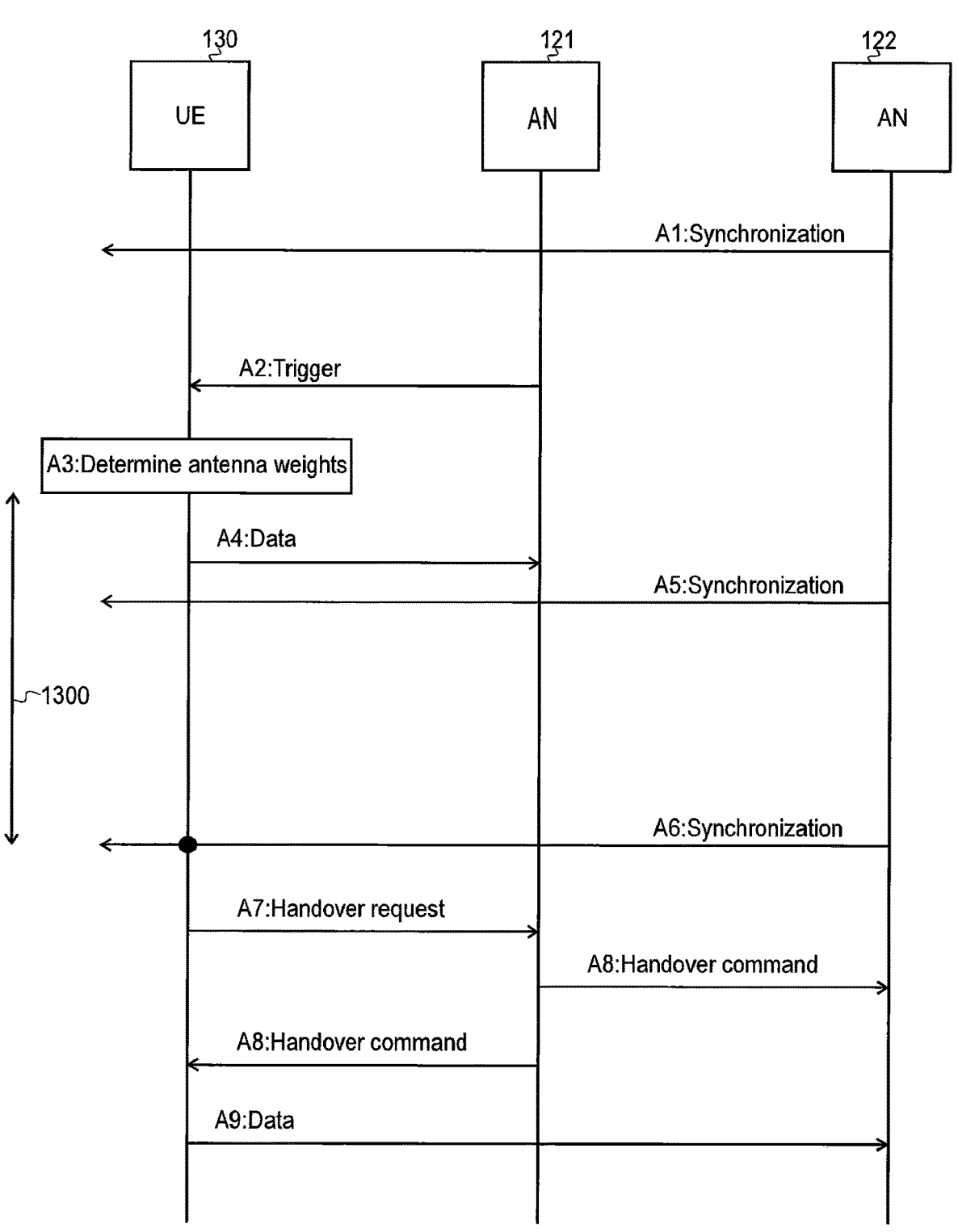
FIG. 13 is a signaling diagram according to various embodiments.

In FIG. 13, a signaling diagram according to various embodiments is illustrated. In the scenario of FIG. 13, the UE 130 is attached to the serving access node 121. A handover from the serving access node 121 to the access node 122 is prepared. For this, the access node 122 sends from time to time synchronization signals A1, A5, A6 in a broadcast transmission.

At A2, a trigger message is sent from the access node 121 to the UE 130. The trigger message prompts the UE 130 to sequentially receive on the plurality of beamformed directions in order to discover the access node 122.

Depending on the distribution of logic between the UE 130 and the access node 121, it is possible that the trigger message exchanged between the access node 121 and the UE 130 comprises further information than the prompt to initiate access node discovery. E.g., it is possible that the trigger message further indicates the preferred spatial direction 310. Based on the preferred spatial direction 310, the UE 130 may prioritize transmission on a first beamformed direction 251 which is coincident with the preferred spatial direction 310 over transmission on a second beamformed direction 252. In various scenarios it is also possible that still further information regarding the prioritization of transmission on the various beamformed directions is included in the trigger message. E.g., it is possible that the trigger message further includes the temporal sequence 500 and/or the frequency of occurrence 300 of the various beamformed directions. E.g., the trigger message may alternatively or additionally include such parameters as: predefined rules in order to establish the temporal sequence 500; probability weights 1100; opening angles of the preferred sector 310. Such information at least implicitly indicates the preferred spatial direction 310.

In particular in a scenario where significant parts of the decision logic for the prioritization are situated within the UE 130, it may be desirable that the trigger message exchanged between the access node 121 and the UE 130 includes an indication of at least parts of the spatial information 195, 231, 741, 742 of the UE 130. E.g., in this regard the access node 121 can determine the position 741 of the UE 130 and/or the movement 741 of the UE 130 from network positioning functionality that is based, e.g., on triangulation or the like. Further, the access node 121 may access the database which includes information on the environment 195 of the UE 130. Here, a geometry/topology of the environment 195 may be stored in a two-dimensional or three-dimensional manner.

At A3, the UE 130 determines its orientation 231 and further determines antenna weights based on the orientation 231. The antenna weights are determined for a plurality of beamformed directions such that transmission on the first beamformed direction 251 is prioritized over transmission on the second beamformed direction 252.

Then, scanning, respectively beam sweeping 1300 of the various beamformed directions within the scanning range 250 is initiated. It should be understood that during the beam sweeping 1300, it is possible that the UE 130 continues to send data to the access node 121 as indicated by A4. Also, the antenna weights may be adjusted during beam sweeping 1300.

As can be seen, a synchronization signal is broadcasted by the access node 122 during said scanning 1300 at A5. However, at the moment in time when the access node 120 sends the synchronization signal A5, the UE 113 receives on a different beamformed directions; consequently, the synchronization signal A5 is not received by the UE 130.

However, the synchronization signal A6 is successfully received by the UE 130; the scanning 1300 is then aborted and preparations for the handover are initiated. This may include sending a handover request A7 the UE 130 to the serving access node 121 which then sends a handover command to the access node 122 and to the UE 130, A8. Then, the handover is executed and data A9 is sent from the UE 130 and received by the access node 122.

Figure 14:
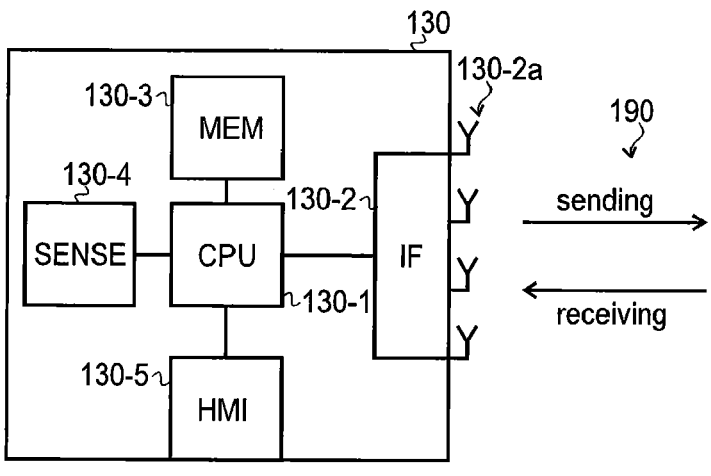
FIG. 14 schematically illustrates a UE according to various embodiments.

In FIG. 14, the UE 130 is illustrated at greater detail. Generally, the UE may implement terminal functionality and/or relay functionality.

The UE 130 comprises a processor 130-1 which is coupled to a non-volatile memory 130-3 and to an interface 130-2. As can be seen from FIG. 14, the interface 130-2 comprises four antennas of an antenna array 130-2a. A larger or smaller number of antennas of the antenna array 130-2a could be provided. Further, the UE 130 comprises a sensor 130-4 which is configured to provide sensor data indicative of at least parts of the spatial information 195, 231, 741, 742 of the UE 130. E.g., the sensor 130-4 can be a GPS sensor, a gyroscope, an accelerometer, a camera, etc. The UE 130 further comprises a human machine interface (HMI) 130-5. The HMI 130-5 can comprise a keyboard, a mouse, a touch sensitive screen, voice input, voice output, one or more buttons, knobs etc.

E.g., control instructions may be stored on the memory 130-3 that, when executed by the processor 130-1, cause the processor 130-1 to execute techniques of determining the orientation 231 of the UE 130, beamforming, beam sweeping, determining the preferred spatial direction/the preferred sector 310, prioritizing transmission on certain beamformed directions during being sweeping, determining antenna weights, determining the temporal sequence 500, and/or determining the frequency of occurrence 300, possibly based on probability weights, as explained above.

E.g., control instructions may be stored in the memory 130-3 that, when executed by the processor 130-1, cause the processor 130-1 to execute techniques of relaying. In such a scenario, it is possible that the UE 130 implements relaying functionality, i.e., forwards data to and from further UEs from and to one of the access nodes 121-123. Here, the UE 130 may act as a proxy. A coverage area of the wireless network 100 may be thus enhanced.

Figure 15:
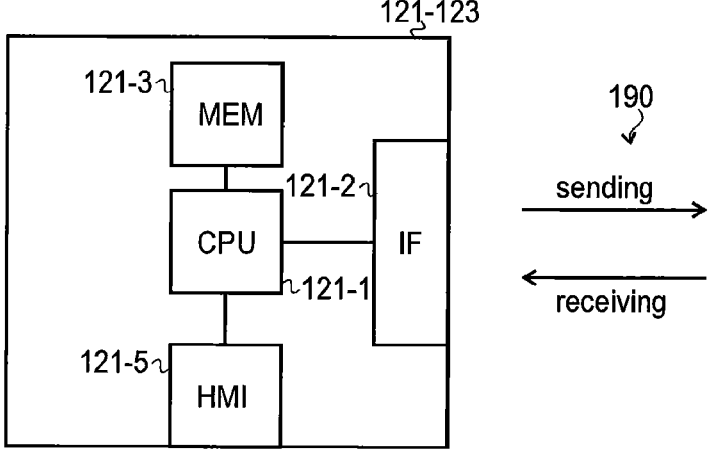
FIG. 15 schematically illustrates an access node according to various embodiments.

In FIG. 15, an access node 121-123 is illustrated. The access node 121-123 comprises a processor 121-1, an interface 121-2, a non-volatile memory 121-3, and a HMI 121-5.

E.g., the interface 130-2 of the UE 130 (see FIG. 14) can be configured to send data to the interface 121-2 of the access node 121-123 on the radio interface 190 of the wireless network 100. Such a direction of transmission is typically referred to uplink transmission. Further, the interface 130-2 of the UE 130 can be configured to receive data from the interface 121-2 of the access node 121-123 on the radio interface 190 of the wireless network 100. Such a direction of transmission is typically referred to as downlink transmission. Also, device-to-device (D2D) communication can be implemented where the interface 130-2 is configured to send data to a further UE and/or configured to receive data from a further UE.

Now referring again to FIG. 15, the memory 121-3 can store control instructions that, when executed by the processor 121-1, cause the processor 121-1 to execute techniques of determining at least parts of the spatial information 195, 231, 741, 742 of the UE 130, determining the preferred spatial direction/the preferred sector 310, determining the prioritization of transmission during beam sweeping by the UE 130, determining the temporal sequence 500, and/or determining the frequency of occurrence 300, possibly based on probability weights, as explained above.

Figure 16:
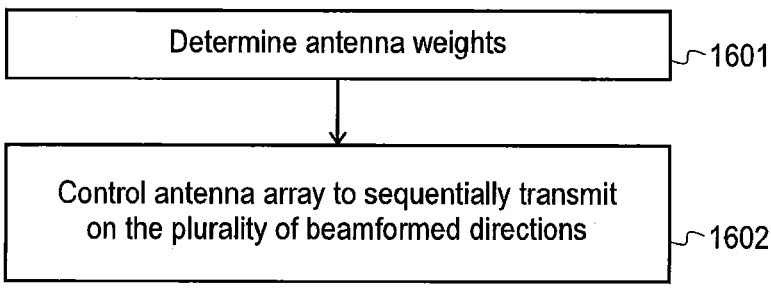
FIG. 16 is a flowchart of a method according to various embodiments.

E.g., control instructions may be stored in the memory 130-3 that, when executed by the processor 130-1, cause the processor 130-1 of the UE 130 to execute a method as illustrated by the flowchart of FIG. 16. Optionally, first, the orientation 231 of the UE 130 is determined, e.g., based on sensor data from a gyroscope (not shown in FIG. 16). Alternatively or additionally, spatial information is received as part of a control message from the network 100. Then, at 1601, based on the spatial information, the antenna weights are determined. E.g., per beamformed direction, a set of antenna weights for all antennas of the antenna array may be determined. Here, further information can be taken into account such as the preferred spatial direction 310 which may be determined by the UE 130 and/or received from the wireless network 100. At 1602, the antenna array 130-2a is controlled to sequentially send and/or receive, i.e., sequentially execute transmission, on the plurality of beamformed directions; transmission on the first beamformed direction 251 which may be coincident with the preferred spatial direction 310 or may be situated in a vicinity of the preferred spatial direction 310, may be prioritized over transmission on further beamformed directions.

Figure 17:
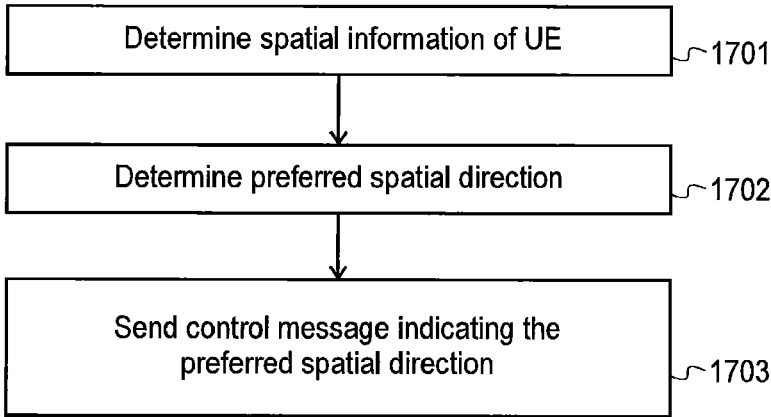
FIG. 17 is a flowchart of a method according to various embodiments.

The memory 121-3 of the network node 121-123 can store control instructions that, when executed by the processor 121-1, cause the processor 121-1 to execute a method as illustrated by the flowchart of FIG. 17. At 1701, the spatial information 195, 231, 741, 742 of the UE 130 is determined, e.g., based on network functionality including information derivable from properties of the radio link 190, e.g., signal strength, phase shifts, etc. Techniques of triangulation may be employed. Further, a status report of the UE 130 may be taken into account which indicates at least parts of the spatial information 195, 231, 741, 742. Next, at 1702, the preferred spatial direction 310 is determined. E.g, the preferred spatial direction 310 may be oriented from the location of the UE 130 towards the location of a further access node 122, 123 to which a handover may be desirable. At 1702, it is possible that one or more further access nodes 122, 123 are selected from a plurality of candidate access nodes based on the determined spatial information 195, 231, 741, 742. E.g., such further access nodes 122, 123 may be selected which are likely to be close to an estimated movement of the UE 130 within the near future.

Optionally, at 1702 further properties of the prioritization of transmission on various beamformed directions can be determined by the network node, e.g., the search space 250, a qualitative or quantitative property of the frequency of occurrence 300 and/or of the temporal sequence 500, etc. All such properties are determined based on the preferred spatial direction 310 and are, therefore, at least implicitly indicative of the preferred spatial direction 310.

At 1703, a corresponding control message is sent to the UE 130 which implicitly or explicitly indicates the preferred spatial direction 310.

As will be appreciated from the above, techniques have been illustrated that allow performing UE beamforming. The beamforming can be applied to sending and/or receiving of signals. The beamforming may be optimized based on directions in which successful transmission is expected to be likely. E.g., such preferred directions are prioritized over the directions. Prioritization can occur based on an increased frequency of occurrence and/or by a specific arrangement of a temporal sequence of the various beamformed directions. Optionally, a historic performance of the beamforming of the UE is taking into account when prioritizing transmission on the various beamformed directions.

Such techniques allow to achieve various effects: e.g., it may be possible to quickly discover an access node by prioritizing such beamformed directions where the access node is likely to be found over other beamformed directions. Further, by appropriately adjusting the search space, it can be possible to provide a sufficient minimum discovery probability of an access node even if the access node is not arranged at the prioritized beamformed direction. Still further, the scanning during beam sweeping may occur in a structured manner, thereby ensuring quick scanning of the entire search space.

Such techniques may generally find various application, e.g., in so-called Multiple-Input Multiple-Output (MIMO) concepts. Here, robustness of data transmission and/or comparably high data rates may be achieved.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

The invention claimed is:

1. A network node of a wireless network, comprising:

at least one processor configured to determine at least one spatial information of a device attached to the wireless network via a radio interface, wherein the at least one processor is configured to determine a preferred spatial direction depending on the at least one spatial information of the device, and wherein the at least one processor is configured to send a control message indicating the preferred spatial direction and prompting the device to execute transmission and/or reception on a plurality of beamformed directions and to prioritize transmission and/or reception on a first beamformed direction of the plurality of beamformed directions over transmission and/or reception on a second beamformed direction of the plurality of beamformed directions.

2. The network node of claim 1, wherein the at least one spatial information comprises a relative position of the device with respect to a second access node of the wireless network towards which the device is conducting a handover, a relative movement of the device with respect to the second access node, an orientation of the device with respect to the second access node, and/or an indication of an environment between the device and the second access node of the wireless network.

3. The network node of claim 1, wherein the control message indicates at least one of a temporal sequence of transmission and/or reception on the plurality of beamformed directions and a frequency of occurrence of transmission and/or reception on each one of the plurality of beamformed directions.

4. The network node of claim 3, wherein the first beamformed direction is arranged before the second beamformed direction in the temporal sequence of transmission and/or reception.

5. The network node of claim 3, wherein the frequency of occurrence of transmission and/or reception on each one of the plurality of beamformed directions is set by providing respective probability weights for an at least partly random temporal pattern of transmission and/or reception on the plurality of beamformed directions.

6. The network node of claim 5, wherein the probability weight of the first beamformed direction is set to correspond to a larger probability of executing transmission and/or reception on the respective beamformed direction than the probability weight of the second beamformed direction.

7. The network node of claim 1, wherein the at least one processor is configured to determine the preferred spatial direction depending on information of previous handover events.

8. A method performed by a network node of a wireless network, comprising:

determining at least one spatial information of a device attached to the wireless network via a radio interface, determining a preferred spatial direction depending on the at least one spatial information of the device, and sending a control message to the device, the control message indicating the preferred spatial direction and prompting the device to execute transmission and/or reception on a plurality of beamformed directions and to prioritize transmission and/or reception on a first beamformed direction of the plurality of beamformed directions over transmission and/or reception on a second beamformed direction of the plurality of beamformed directions.

9. The method of claim 8, wherein the at least one spatial information comprises a relative position of the device with respect to a second access node of the wireless network towards which the device is conducting a handover, a relative movement of the device with respect to the second access node, an orientation of the device with respect to the second access node, and/or an indication of an environment between the device and the second access node of the wireless network.

10. The method of claim 8, wherein the control message indicates at least one of a temporal sequence of transmission and/or reception on the plurality of beamformed directions and a frequency of occurrence of transmission and/or reception on each one of the plurality of beamformed directions.

11. The method of claim 10, wherein the first beamformed direction is arranged before the second beamformed direction in the temporal sequence of transmission and/or reception.

12. The method of claim 10, wherein the frequency of occurrence of transmission and/or reception on each one of the plurality of beamformed directions is set by providing respective probability weights for an at least partly random temporal pattern of transmission and/or reception on the plurality of beamformed directions.

13. The method of claim 12, wherein the probability weight of the first beamformed direction is set to correspond to a larger probability of executing transmission and/or reception on the respective beamformed direction than the probability weight of the second beamformed direction.

14. The method of claim 8, further comprising determining the preferred spatial direction based on information of previous handover events.

* * * * *